United States Patent Office.

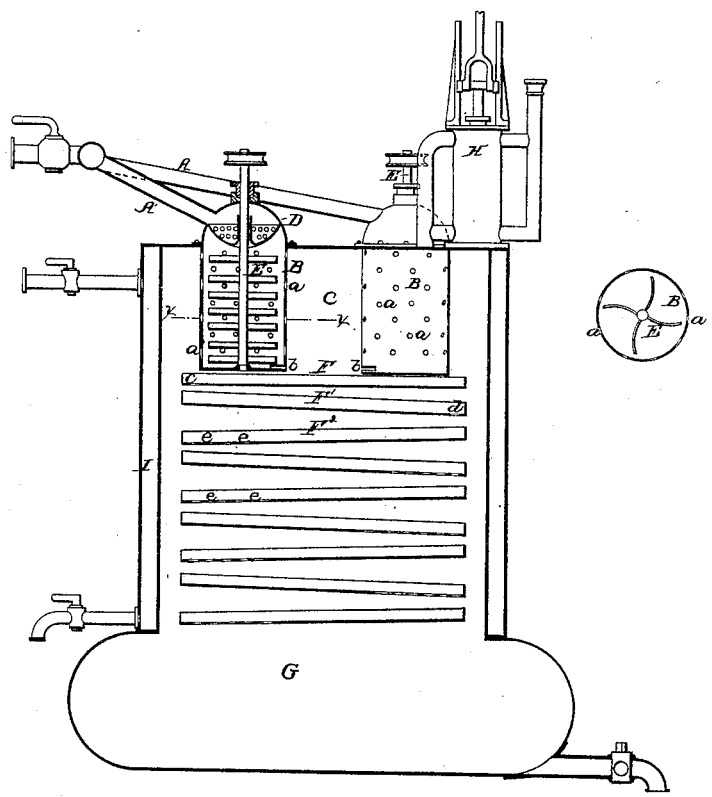

REUBEN D. TURNER, OF NEW YORK, N. Y.

Letters Patent No. 69,275, dated September 24, 1867.

---

IMPROVED APPARATUS FOR AGING AND REFINING WINES AND LIQUORS.

---

The Schedule referred to in these Letters Patent and making part of the same.

---

TO ALL WHOM IT MAY CONCERN:

Be it known that I, REUBEN D. TURNER, of the city, county, and State of New York, have invented a new and useful improvement on Apparatus for Aging and Refining Wines, Alcoholic Spirits, and other Liquors, of which the following is a full, clear, and exact description, reference being had to the accompanying drawing, forming part of this specification, and in which—

Figure 1 represents a vertical section of an apparatus constructed according to my improvement, and Figure 2 a horizontal section, in part, through the line $x\ x$ in fig. 1.

Similar letters of reference indicate corresponding parts.

To simplify the description of or make clearer my improvement, the same will be explained with reference to aging and refining wines or other like liquors, with the following prefatory remarks:

It is an acknowledged principle that the quality of wines is improved as much or more by what is extracted as by what is put into them; also that the same element that gives them odor gives them also flavor. These remarks apply equally to other liquors. Furthermore, it has been demonstrated that this element is volatile, and that the volatile gases or substances composing the same can be separated and controlled *in vacuo*. In the ordinary or natural process of aging liquors or wines, the escape of the noxious odoriferous volatile gases is impeded, firstly, by the pressure of the atmosphere, and, secondly, by the attraction of the same to the liquor. To expedite the process of aging or refining, it has before been proposed to employ both heat and agitation; but my invention aims at accomplishing the same in a more perfect or effectual manner by removing the two obstructions specified, and at the same time placing the liquor in conditions most favorable to the escape of its volatile flavoring element, the pressure of the atmosphere being removed by treating the wine or liquor *in vacuo*, and throwing it into spray or mist, and, after again collecting it in liquid form, running it into a thin body or flow over a series of perforated plates, thereby presenting an increased exposure or surface for its treatment, while the attraction is broken by raising the liquor, during such treatment, to a degree only a little below the vaporizing point, thus setting free the volatile gases, and allowing them to escape into the vacuum, from which they may be drawn by pump.

Having thus specified the object and nature of my improvement, I will now proceed to describe it with reference to the accompanying drawing, referring to which, A represents the pipe or pipes for conveying the wine to be treated to one, two, or more vessels B, which are of a close character so far as exposure to the external atmosphere is concerned. These vessels are arranged to occupy a position within a vacuum-chamber, C, at or near its top, and are provided internally with an upper perforated distributing-basin, D, to the wine as it is conveyed to said vessel or vessels. An agitator, E, composed of arched or crooked vanes, preferably arranged in a spiral or intermediate manner around a vertical shaft, is made to rotate, by any suitable means, within said vessel B, the hollow or arched configuration of the vanes occupying an advanced position, so as to break up the distributed wine or liquor as it issues from the perforated basin D without scattering or forcing it through perforations $a$, made in the sides of the vessels B, which establish communication between the interior of said vessels and the vacuum-chamber C, and which perforations are for the purpose of passing off any gases detached from the liquor as it is broken into spray by the agitators, said mist or spray finally resolving itself, at the bottom of the vessels B, into a more compact or liquid form, and escaping, by apertures $b$, in a thin stream, on to a tray, F, from which it runs, by an aperture, $c$, on to an under inclined tray, $F^1$, and from thence, through an aperture, $d$, on to a reversed inclined tray, $F^2$, and so on for any number of trays, one below the other, all arranged within the vacuum-chamber C, and each having a reversed rim or inclined set to the one immediately above it, with the delivery-apertures at the lower end of them, and further, or for the most part, being provided with perforations $e$ in their bottom, the liquor ultimately delivering itself into a receiver, G, from which it may be drawn off as required. In this way, it will be seen, not only is an agitation of the wine kept up *in vacuo*, but such a scattered distribution of it in thin layers or streams, and general or enlarged surface exposure of it, as is most favorable to the escape of the noxious, odoriferous, and volatile gases that may be drawn off by an air-pump, H, or otherwise, and allowed to pass off either to the atmosphere, or to a condenser for after-treatment. It is not, however, by agitation or separation into mist, and after surface distribution or exposure, with the atmospheric pressure removed, that the result sought to be obtained alone is secured, but, in addition or conjunction with such treatment, simultaneously subjecting the wine or liquor to a degree of heat but little below its vaporizing point or temperature, whereby the attraction of the gases to the liquor is broken up, and a freer escape established for the gases by the increase in volume of the liquor, and consequently more open character given to the same. This may be done by surrounding the chamber C with a jacket, I, provided with suitable inlet and outlet pipes, and kept to the desired temperature by the circulation through it and round the chamber C of steam, hot water, or other fluid.

What I claim as my invention, and desire to secure by Letters Patent, is—

1. The process, substantially as herein described, of treating wine or other liquor *in vacuo*, and under the influence of heat, by agitating it in a distributed form, so as to convert it into spray, and afterwards circulating the same, in a more compact or liquid state, in thin layers or streams, essentially as and for the purpose or purposes herein set forth.

2. The combination, with the vacuum-chamber C, of one or more perforated vessels B, having perforated receiving-distributors at or near their top, and agitators operating within them, substantially as specified.

3. In combination with the vacuum-chamber C, and vessel or vessels B, having agitators operating within them, of a series of reversely-inclined trays or surface-distributors, arranged for operation in connection with the agitators, essentially as herein set forth.

REUBEN D. TURNER.

Witnesses:
J. W. COOMBS,
G. W. REED.